United States Patent
Gertisser

[11] 3,792,969
[45] Feb. 19, 1974

[54] PROCESS FOR DYEING POLYACRYLONITRILE TEXTILES WITH ANTHRAQUINONE DYESTUFFS

[75] Inventor: Berthold Gertisser, Muenchenstein/Bl, Switzerland

[73] Assignee: Sandoz Ltd., Basle, Switzerland

[22] Filed: Nov. 30, 1971

[21] Appl. No.: 203,419

Related U.S. Application Data
[62] Division of Ser. No. 704,528, Feb. 12, 1968, Pat. No. 3,652,601.

[30] Foreign Application Priority Data
Feb. 20, 1967  Switzerland............ 489566/67
Jan. 18, 1968  Switzerland............ 506586/68

[52] U.S. Cl.............. 8/39, 8/177 AB, 260/379, 260/380
[51] Int. Cl............. D06p 1/20, D06p 3/72
[58] Field of Search..... 8/39, 177 AB; 260/380, 379

[56] References Cited
UNITED STATES PATENTS
3,338,660  8/1967  Biedermann............... 8/54
3,499,916  3/1970  Gertisser.................. 8/39 X FOREIGN PATENTS OR APPLICATIONS
603,298  8/1960  Canada................... 260/380

Primary Examiner—Leon D. Rosdol
Assistant Examiner—T. J. Herbert, Jr.

[57]  ABSTRACT

Anthraquinone dyes of the formula

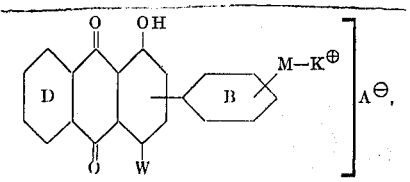

wherein M stands for a divalent radical, W for the nitro group or for an amino group, $K^+$ e.g. for an ammonium-, hydrazinium- or an amminogroup, $A^-$ for an anion and wherein the ring B and/or D may be further substituted. They can be used for the dyeing of acrylonitrile polymers or copolymers.

9 Claims, No Drawings

PROCESS FOR DYEING POLYACRYLONITRILE TEXTILES WITH ANTHRAQUINONE DYESTUFFS

The present application is a division of application Ser. No. 704,528, filed Feb. 12, 1968, now U.S. Pat. No. 3,652,601.

It relates to a process for the dyeing or printing of textile materials consisting wholly or in part of acrylonitrile polymers or copolymers with dyes of the anthraquinone series having the formula

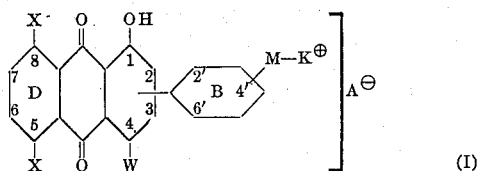

where M stands for a divalent bridge member, one X for a hydroxyl or nitro group or a substituted or unsubstituted amino group, the other X for a hydroxyl group or a substituted or unsubstituted amino group, W for the nitro group or a substituted or unsubstituted amino group, $A^-$ for an anion equivalent to the cation, $K^+$ for a group of the formula

or

and where the rings B and/or D may be further substituted and the group $-M-K]^+$ occupies the position 2' or 4'.

In formulae (II) and (III) $R_1$ stands together with $R_2$ and the adjacent N atom for a heterocycle, $R_3$ and $R_4$ for hydrogen or identical or different alkyl or cycloalkyl radicals which may be substituted or for indentical or different acyl radicals, $R_1$ together with $R_3$ and/or $R_2$ together with $R_4$ and the N atoms adjacent to these substituents may form heterocycles whereby $R_1$ and/or $R_2$ stands for an alkyl or cycloalkyl radical which may be substituted, and $R_5$ and $R_6$ or $R_5$, $R_6$ and $R_7$ together with the adjacent N atom may form heterocycles.

Particularly good dyeings are obtained using dyes of the formula

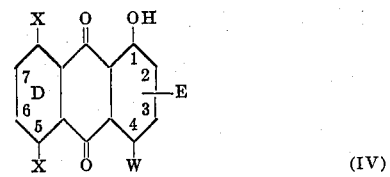

where E represents a radical of the formula

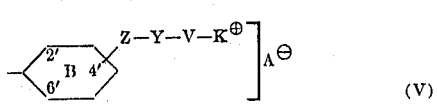

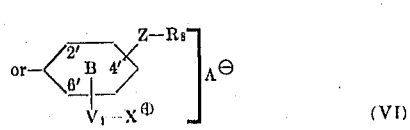

where Z stands for an oxygen or sulphur atom, Y for the direct linkage or for an arylene radical which may be substituted and is bound to V either directly or through a hetero atom or a group of hetero atoms, V for an alkylene radical which may be substituted and may be interrupted by hetero atoms or groups of hetero atoms, $V_1$ for a divalent bridge member bound to $K^+$ through a carbon atom, $R_8$ for a hydrogen atom or a hydrocarbon group which latter may be substituted, and where the rings B and/or D may be further substituted and the group $-Z-Y-V-K^+$ or the group $-Z-R_8$ stands in the position 2' or 4'.

The present invention relates further to:

1. basic anthraquinone dyes free from sulphonic acid groups and of the formula

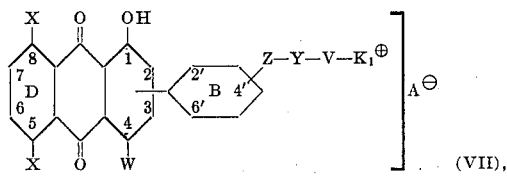

where $K_1$ stands for a group of formula (II) or a group of formula

where $R_9$ and $R_{10}$ or $R_9$, $R_{10}$ and $R_{11}$, together with the adjacent N atom, may form a heterocycle the rings B and/or D may be further substituted, and the group $-Z-Y-V-K_1^+$] stands in position 2' or 4';

2. basic anthraquinone dyes free from sulphonic acid groups and of the formula

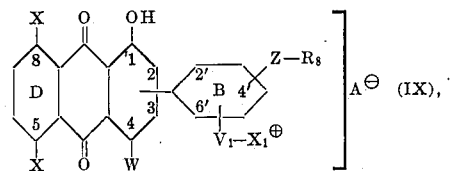

where the $-Z-R_8$ group stands in position 2' or 4';

3. anthraquinone dyes free from sulphonic acid groups and of the formula

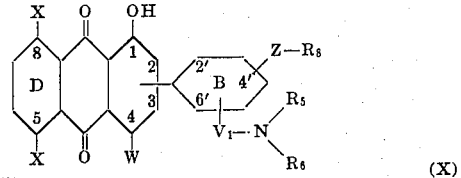

where the $-Z-R_8$ group stands in position 2' or 4';

4. basic anthraquinone dyes free from sulphonic acid groups and of formula (VII), in which at least one of the symbols X and W denotes an alkylamino or arylamino group which may bear further substituents.

The dyes of formula (VII) can be produced by means of the following reactions:

a. the reaction of an anthraquinone compound of the formula

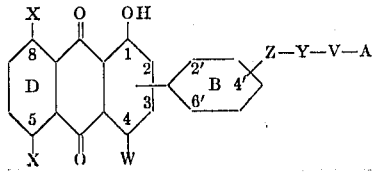

where A represents the acid radical of an ester, with a compound of the formula

or with a compound of the formula

b. the reaction of an anthraquinone compound of the formula

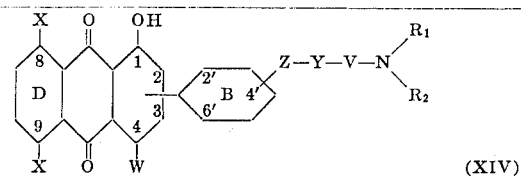

with a compound of the formula

Halogen — NH$_2$ (XV)

or with a compound of the formula

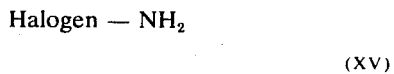

or the conversion of an anthraquinone compound of the formula

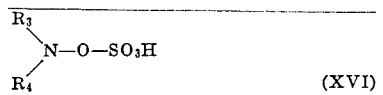

by the action of a quaternating agent into a compound of the formula

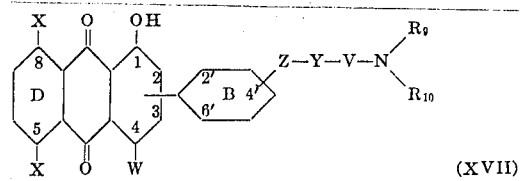

where $R_{12}$ stands for an alkyl or cycloalkyl radical which may be substituted;

c. the reaction of a boric acid ester of an anthraquinone compound of the formula

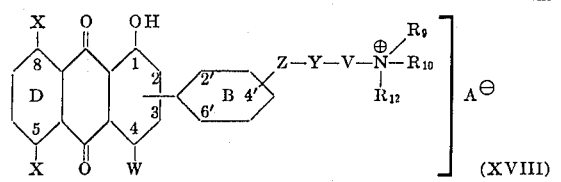

with a compound of the formula

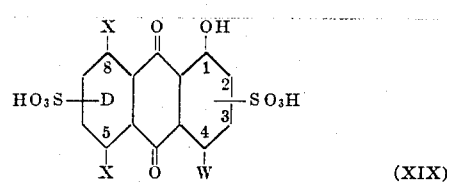

to yield a boric acid ester of a compound of the formula

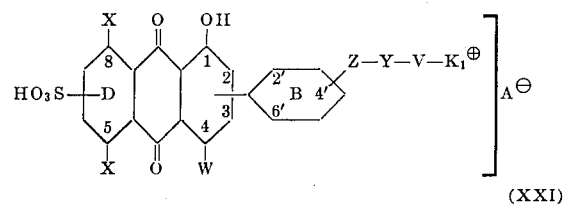

followed by saponification of the boric acid ester group and exchange of the -SO$_3$H- group for a hydrogen atom or a non-water-solubilizing group;

d. the reaction of a compound of the formula

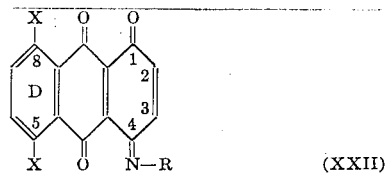

where R stands for hydrogen or a hydrocarbon radical which may be substituted, with a compound of the formula (XX);

the reaction of a boric acid ester of a compound of the formula

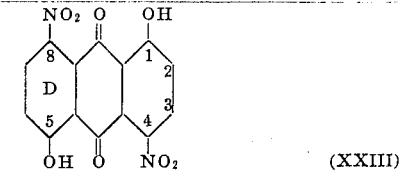

with a compound of formula (XX), followed by saponification of the boric acid ester group and, where necessary, reduction of the nitro groups to amino groups.

The dyes of formula (IX) can be produced by means of the following reactions:

a. the reaction of an anthraquinone compound of the formula

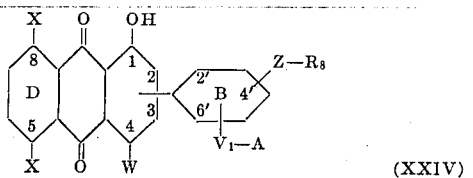

with a compound of formula (XII) or (XIII);

b. the reaction of an anthraquinone compound of the formula

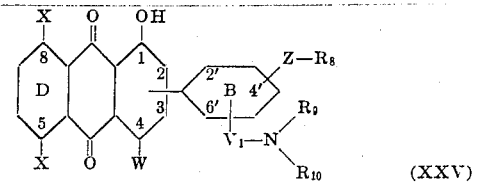

with a compound of formula (XV) or (XVI), or the conversion of an anthraquinone compound of the formula

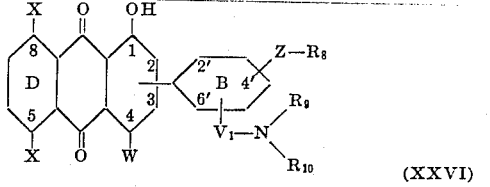

by means of a quaternating agent into a compound of the formula

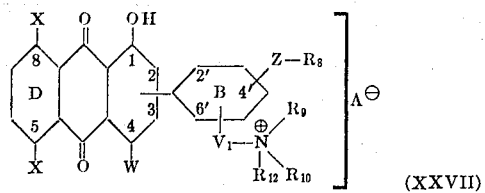

(XXVII)

c. the reaction of a boric acid ester of an anthraquinone compound of the formula

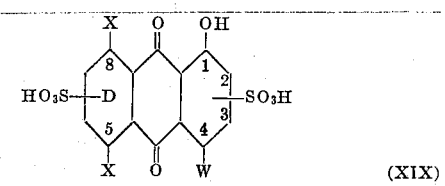

(XIX)

with a compound of the formula

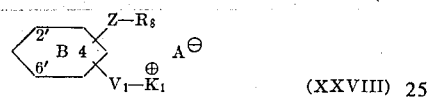

(XXVIII)

to give a boric acid ester of a compound of the formula

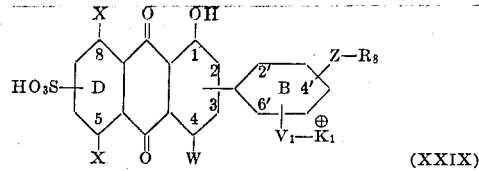

(XXIX)

with subsequent saponification of the boric acid ester group and exchange of the -SOH - group for a hydrogen atom or a non-water solubilizing group;

d. the reaction of a compound of formula (XXII) with a compound of formula (XXVIII);

e. the reaction of a boric acid ester of a compound of formula (XXIII) with a compound of formula (XXVIII), followed by saponification of the boric acid ester group and, where necessary, reduction of the nitro groups to amino groups. The dyes of formula (X) can be produced by means of the following reactions:

a. the reaction of an anthraquinone compound of formula (XXIV) with a compound of formula

(XXX);

b. the reaction of the boric acid ester of a compound of formula (XIX) with a compound of the formula

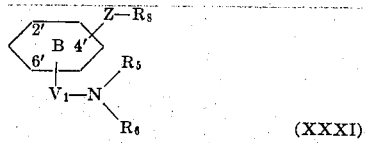

(XXXI)

to give a boric acid ester of a compound of the formula

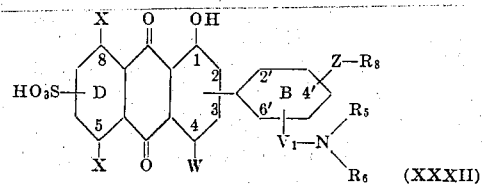

(XXXII)

saponification of the boric acid ester group in the latter compound and exchange of its -SO₃H - group for a hydrogen atom or a non-water-solubilizing group;

c. the reaction of a compound of formula (XXII) with a compound of formula (XXXI);

d. the reaction of a boric ester of a compound of formula (XXIII) with a compound of formula (XXXI), saponification of the boric acid ester group in this and, where necessary, reduction of the nitro groups to amino groups.

The dyes of formula (VII), in which at least one of the symbols X and W stands for an alkylamino or arylamino group which may be further substituted, can be obtained by alkylation or arylation of an anthraquinone compound of formula (VII) in which at least one of the symbols X or W represents a primary amino group.

Anthraquinone dyes of the formula

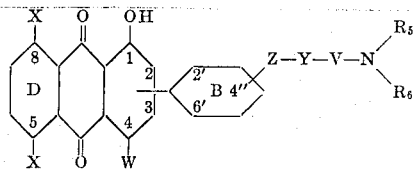

(XXXIII)

can be obtained by reacting a boric ester of an anthraquinone compound of formula (XIX) with a compound of the formula

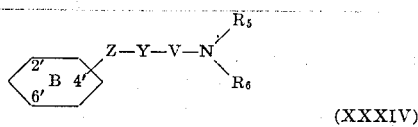

(XXXIV)

to give a boric acid ester of a compound of the formula

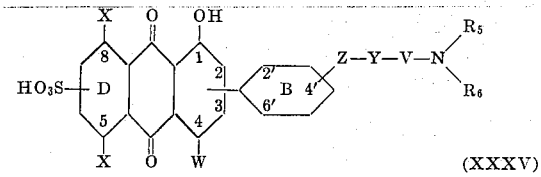

(XXXV)

after which the boric acid group is saponified and the -SO₃H- group exchanged for a hydrogen atom or a non-water-solubilizing group. The radical

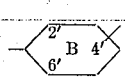

stands preferably in ortho-position to the substituent W, although it may be bound to the hydroxyl group in ortho-position.

Compounds of formula (XI) in which A may denote for example halogen, can be prepared as described in French Pat. No. 1,218,936. Compounds of formulae (XIV) and (XVII) can be prepared as specified in German Auslegeschrift No. 1,228,734. Compounds of formula (XXIV), in which A may represent for example, halogen and R₈ an alkyl radical, can be prepared by reacting the dyes disclosed in French Pat. No. 1,218,936 with, for example, N-hydroxymethylchloroacetamide.

The anion A⁻ in the compounds of formula (I), (VII) and (IX) may be exchanged for an other anion, for example with the aid of an ion exchanger.

In each instance halogen represents, preferably chlorine or bromine. One example of an optionally substituted amino group is a group of formula -NH-R, where R may represent hydrogen or a substituted or unsubstituted hydrocarbon radical, e.g. an unsubstituted or substituted alkyl radical having one to 12 carbon atoms, such as a methyl, ethyl propyl or butyl radical; a cycloalkyl radical, such as a cyclohexyl or methylcyclohexyl radical, an aralkyl radical, such as the benzyl radical; or an aryl radical, such as the phenyl or naphthyl radical. If these radicals are substituted they bear in particular, a hydroxyl group, a halogen atom or the cyano group. The aryl radical may be substituted by alkyl or alkoxy which itself may be substituted. When none of the radicals $R_3$ to $R_7$ represents a hydrogen atom and neither $R_3$ or $R_4$ is an acyl radical, the radicals $R_1$ to $R_7$ and $R_9$ to $R_{12}$ represent unsubstituted or substituted alkyl radicals having one to six or preferably one to four carbon atoms, such as methyl, ethyl, propyl or butyl radicals, or cycloalkyl radicals, such as the cyclohexyl radical.

If these radicals are substituted, they bear preferably a hydroxyl group, a halogen atom or a cyano group. The alkyl radicals may be substituted by an aryl radical, e.g. a phenyl radical, and are then aralkyl radicals, such as the benzyl radical.

The radicals $R_1$ and $R_2$ together with the adjacent N-atom may form a heterocycle, e.g. a pyrrolidine, piperazine, morpholine, aziridine, or piperidine ring. The radical $R_1$ together with $R_3$ and/or the radical $R_2$ together with $R_4$ and the N-atoms adjacent to these substituents may form a saturated or unsaturated, preferably five- or six-membered heterocycle, for example a pyrazolidine, pyridazine or pyrazoline ring, such as trimethylene pyrazolidine or tetramethylene pyrazolidine.

When $R_3$ or $R_4$ are acyl radicals, they are preferably of the formula $R_{13}$-$SO_2$- or $R_{14}$-CO- where $R_{13}$ represents an aromatic or a saturated or unsaturated aliphatic or cycloaliphatic radical and $R_{14}$ represents hydrogen or $R_{13}$. The two acyl radicals together with the adjacent N-atom may form a ring. $R_3$ or $R_4$ may be, for example, formyl, acetyl, propionyl, butyroyl, acryloyl, cyanoacetyl, benzoyl, methylsulphonyl, or substituted or unsubstituted phenylsulphonyl.

The radicals $R_5$ and $R_6$, and similarly the radicals $R_9$ and $R_{10}$, in each case jointly with the adjacent N-atom, may form a heterocycle, for example a pyrrolidine, piperidine, morpholine, aziridine or piperazine ring.

The radicals $R_5$, $R_6$ and $R_7$, or the radicals $R_9$, $R_{10}$ and $R_{11}$, in each case jointly with the adjacent N-atom, may form a pyridine ring or a heterocycle, e.g. a group of the formula

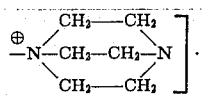

Y may stand preferably for the direct linkage or for a phenylene radical which may be substituted and is bound to V either directly or through a hetero atom or a group of hetero atoms.

V stands for a substituted or unsubstituted, branched or unbranched alkylene radical having one to 12 or, preferably one to four carbon atoms, which may be interrupted by hetero atoms or groups of hetero atoms.

Examples of hetero atoms or groups of hetero atoms are:

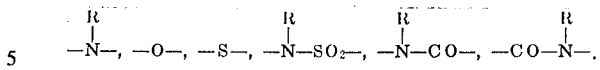

The following are named as examples of bridge members $V_1$:

-$(CH_2)_p$- where $p$ represents a figure from 1 to 6, -$CH_2$-CH-$CH_3$, -O-$(CH_2)_p$-, -$(CH_2)_p$-O-$(CH_2)_q$- where $q$ represents a figure from 1 to 6, -$CH_2$-CHOH-$CH_2$-, -$(CH_2)_p$-O-CO-$CH_2$-, -$(CH_2)_p$-NH-$(CH_2)_q$-, -$CH_2$-NH-CO-$CO_2$-. Alkyl generally stands for an alkyl radical having one to six or preferably one to three carbon atoms. If the radical $R_8$ does not stand for a hydrogen atom, it may have the same significance as R.

The rings B and/or D may with advantage be further substituted by non-water-solubilizing substituents. They contain preferably halogen atoms, the hydroxyl group, lower alkyl or alkoxy, hydroxyaryl or alkoxyaryl groups.

The preferred acid radicals A are those of hydrohalic acids; A usually represents Cl or Br. Further examples of acid radicals A are those of sulphuric acid, of a sulphonic acid or of hydrogen sulphite.

The anion $A^-$ may be an organic or inorganic ion, for example the ion of a halogen, such as chloride, bromide or iodide, or of methyl sulphate, sulphate; disulphate, perchlorate, phosphate; phosphotungstic molybdate, benzene sulphonate, naphthalene sulphonate, 4-chlorobenzene sulphonate, oxalate, maleinate, acetate, propionate, methane sulphonate, chloracetate or benzoate, or a complex anion such as that of zinc chloride double salts.

In Belgian Pat. No. 630,895 an anthraquinone dye of the formula

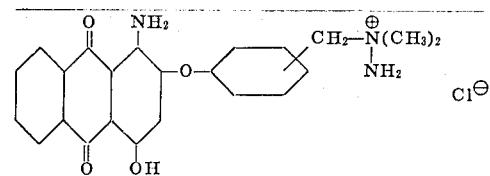

is described and in Belgian Pat. No. 581,785 one of the formula

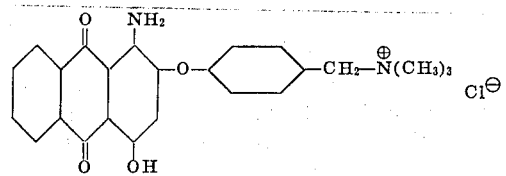

These two dyes are suitable for dyeing acrylic fibres among other materials. It is surprising that the dyes of formula (I) have substantially greater power of build-up and higher fastness to light than these dyes on acrylic fibres.

The reaction of a compound of formula (XI) or (XXIV) with a compound of formula (XII), (XIII) or (XXX) is carried out preferably in an organic solvent at temperatures of −50° to +250°C, or preferably −10° to +120°C. The reaction can be conducted in aqueous medium with addition of an organic solvent if desired, or in the absence of organic solvent at the aforestated temperatures.

The reaction of a compound of formula (XIV) or (XXV) with a halogen amine of formula (XV) is carried out preferably in an organic solvent at temperatures of −50° to +80°C. The reaction can also be effected in aqueous medium at the stated temperatures with addition of an organic solvent if desired, in which case the halogen amine can be employed in vapour form or in solution in an organic solvent, in water or in a mixture of organic solvent and water.

The reaction of an amine of formula (XIV) or (XXV) with a hydroxylamine-O-sulphonic acid of formula (XXVI) is carried out preferably at −10° to +100°C.

The reaction of an anthraquinone compound of the formula

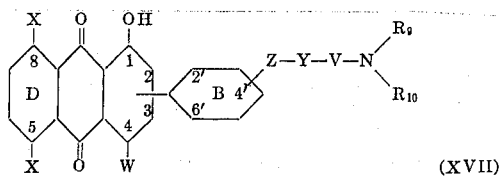

(XVII)

with a quaternating agent to form a compound of the formula

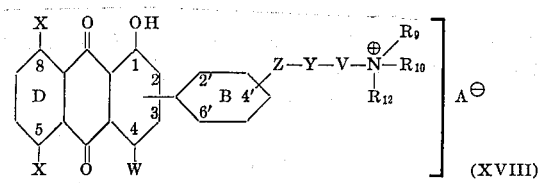

(XVIII)

or the reaction of an anthraquinone compound of the formula

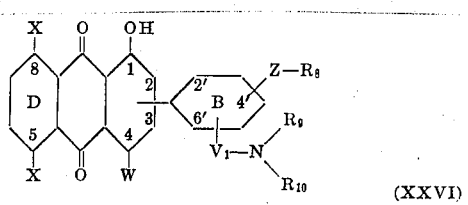

(XXVI)

with a quaternating agent to form compound of the formula

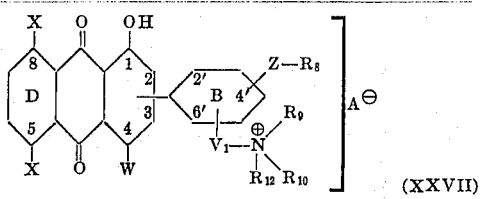

(XXVII)

is carried out preferably in an inert solvent or in aqueous suspension or without solvent in an excess of the quaternating agent at elevated temperatures, and if necessary in a buffered medium. Examples of quaternating agents are alkyl halides, such as methyl and ethyl chloride, bromide and iodide, alkylsulphates, such as dimethylsulphate; acrylic acid amide/hydrohalide, e.g. $CH_2=CH-CO-NH_2/HCl$.

The reaction of an anthraquinone compound of formula (XIX) with a compound of formula (XX), (XXVII), (XXXI) or (XXXIV) to form a boric acid ester of a compound of formula (XXI), (XXIV), (XXXII) or (XXXV), the subsequent saponification of the boric acid ester group in these compounds and the exchange of the $-SO_3H-$ group for a hydrogen atom or a non-water-solubilizing group is carried out by the known methods, for example as given by J. Houben in "Das Anthracen und die Anthrachinone," 1929, page 449.

The reaction of a compound of formula (XXII) with a compound of formula (XX), (XXVIII) or (XXI) can likewise be effected by one of the known methods, for example that described in German Auslegeschrift No. 1,228,734.

The reaction of a compound of formula (XX), (XXVIII) or (XXXI) and subsequent saponification of the boric acid ester group and reduction of groups to amino groups can also be carried out by the known methods.

The alkylation of a compound of formula (VII), in which at least one of the symbols X AND W stands for an alkyl or arylamine group which may be further substituted, is conducted preferably in an inert solvent or in aqueous suspension or without solvent in an excess of the alkylating or arylating agent at elevated temperatures and, if necessary, in buffered medium. The preferred alkylating agents are epoxides, for example propylene oxide, epichlorohydrin; and ethylene oxide. Alternatively, the ordinary alkylating agents can be employed, for example alkyl halides, such as methyl or ethyl chloride, bromide or iodide; alkylsulphates, such as dimethylsulphate, acrylamide; acrylonitrile; divinyl sulphone. Arylation is carried out advantageously with agents which donate aryl, preferably phenyl, which may be further substituted, for example halogen-aryl compounds, such as halogen benzenes, e.g. bromobenzene.

The new dyes are used for dyeing and printing filaments, fibres and textiles consisting wholly of in part of acrylonitrile polymers or copolymers. They can also be employed for dyeing leather, for the mass coloration of plastics and for the dyeing of paper in the stock.

The dyes are applied preferably from an aqueous neutral or acid medium at the boil or at temperatures above 100°C with pressure. They give very level dyeings without the assistance of retarders. Very good results are obtained on blend yarns and fabrics containing an acrylic fibre component. Those dyes which have good solubility in organic solvents are suitable for the coloration of plastics, synthetic resins and natural resins. A number of the new dyes can be used for dyeing tannin-treated cotton, regenerated cellulose, synthetic polyamides, leather and paper. It has been found of a great advantage to employ mixtures of two or more of these dyes.

The dyeings obtained have good fastness to light, washing, water, sea water, perspiration, sublimation, cross dyeing, decatizing, pressing, bleaching, dry cleaning and solvents. They are well soluble in water, have good pH-stability and good power of build-up. They are suitable for combination and, in mixture with other basic dyes, give excellent dyeings. In the following Examples the parts and percentages are by weight and the temperatures in degree centigrade.

EXAMPLE 1

4.25 Parts of a compound of the formula

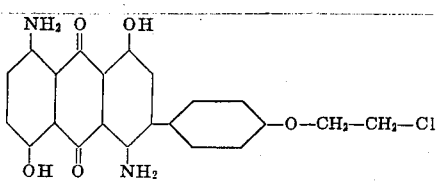

(as disclosed in French Patent 1,218,936) are dissolved in 20 parts of dimethyl formamide at 60° and 3 parts of asymmetrical dimethyl hydrazine are added dropwise to the solution. The mixture is stirred for 18 hours at 60°–65°, after which time 40 parts of chlorobenzene are dropped in at 60°–66°. On this addition the dye of the formula

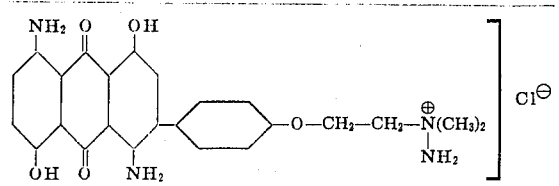

settles out. On drying it is obtained as a crystalline powder of violet colour which dyes acrylic fibres in bright blue shades having very good all-round fastness.

EXAMPLE 2

4.25 Parts of the same starting compound as in Example 1 are entered into 20 parts of pyridine and the resulting mixture is boiled for 12 hours with reflux. After cooling to 60°, 20 parts of chlorobenzene are dropped into the reaction mixture, upon which the dye of the formula

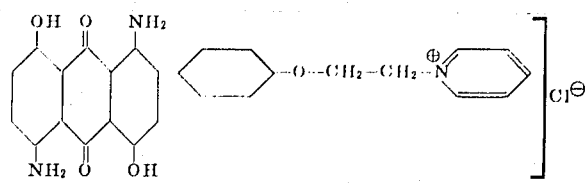

settles out in crystalline form. The dye can be obtained in the pure form by recrystallization from dimethyl formamide. It is a violet powder which gives very fast bright blue dyeings of intense depth on acrylic fibres.

EXAMPLE 2a 4.3 Parts of a compound of the formula

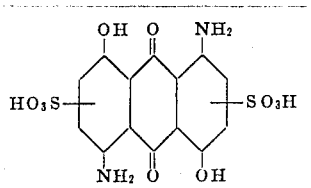

are mixed with 1.9 parts of boric acid; 22 parts of 96 percent sulphuric acid are added and the mixture is cooled to 20°. At this temperature 2.5 parts of a compound of the formula

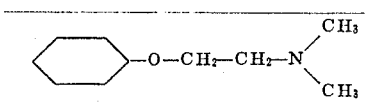

are added with simultaneous cooling of the reaction mixture. The mixture is then stirred for 12 hours at 20° and subsequently discharged into a solution of 11.5 parts of sodium sulphate in 100 parts of water. The first sulpho group of the reaction product is split off by one of the known methods with simultaneous saponification of the boric acid ester group, after which the second $SO_3H$ group is split off. A blue-violet powder is obtained which has the formula

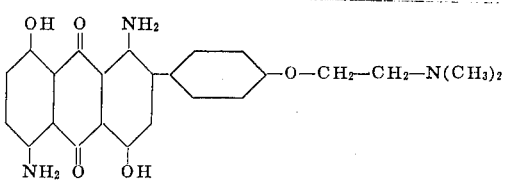

This dye can be applied to acrylic fibres to give deep, bright blue shades.

EXAMPLE 2b 4.33 Parts of the compound obtained as given in Example 4 are dissolved in 40 parts of chlorobenzene at the boil. An aqueous solution of 1.38 parts of dimethyl sulphate and 4 parts of chlorobenzene is added dropwise, the mixture stirred for 3½ hours at the boil with reflux, and the reaction product filtered off hot. The filter cake is washed with hot chlorobenzene solution until this runs off colourless. The dye thus obtained has the formula

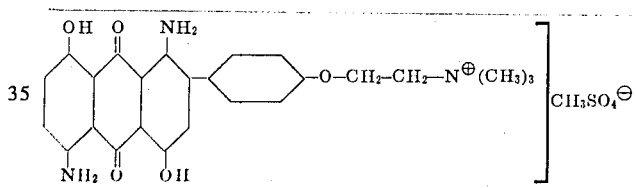

It can be recrystallized from dimethyl formamide. On drying it is obtained as a blue-violet powder which gives bright blue dyeings of good depth and excellent fastness on acrylic fibres.

The structural composition of further dyes which can be produced by the procedures of Examples 1 and 2 is given in the following Table I.

The symbols $K^+$, T, Z, W, $X_1$ to $X_6$ in the formula

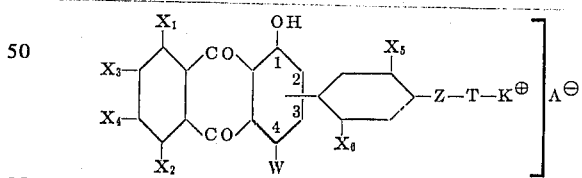

have the meanings given them in the table. The anion may be any one of those named in the specification. The symbol $K^+$ may stand for any of the radicals $K_9$ to $K_{18}$, $K_{22}$ to $K_{24}$ or $K_{27}$ given in Table A. These groupings may be exchanged for any other of the given groupings in any individual dye.

TABLE A $K^+$ can stand for any one of the symbols $K_9$ to $K_{18}$, $K_{22}$ to $K_{24}$ or $K_{27}$ which represent the following groupings:

K₉ represents 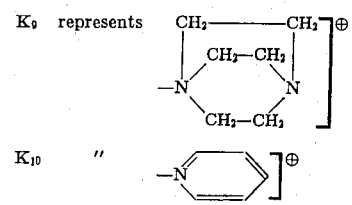

K₁₀ " 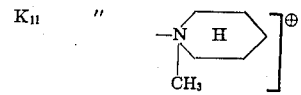

K₁₁ " 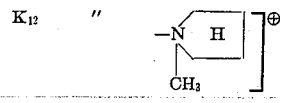

K₁₂ " 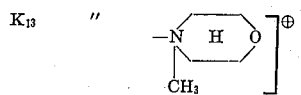

K₁₃ " 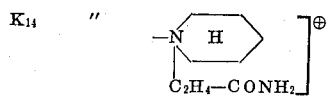

K₁₄ " 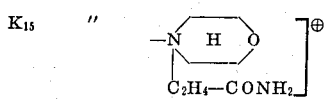

K₁₅ "

K₁₆ " 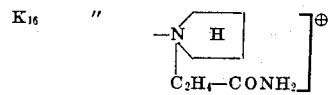

K₁₇ " 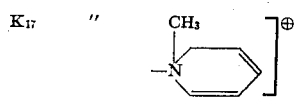

K₁₈ " 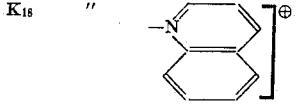

K₂₂ " 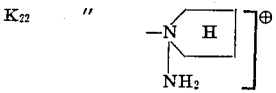

K₂₃ " 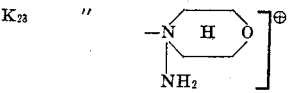

K₂₄ " 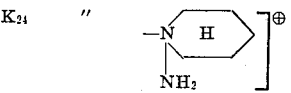

K₂₇ " 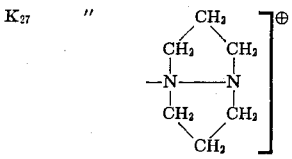

TABLE 1

| Expl. No. | K⊕ | T | Z | W | X₁ | X₂ | X₃ | X₄ | X₅ | X₆ | Shade of dyeing on acrylic fibre |
|---|---|---|---|---|---|---|---|---|---|---|---|
| 3 | K₉ | —C₂H₄— | O | NH₂ | —NH₂ | OH | H | H | H | H | Blue. |
| 4 | K₁₁ | —C₂H₄— | O | —NH—⌬H | —NH—⌬H | OH | H | H | H | H | Greenish blue. |
| 5 | K₁₂ | —C₂H₄— | O | NH₂ | NH₂ | OH | H | H | H | H | Blue. |
| 6 | K₁₃ | —C₂H₄— | O | HN₂ | —NH—⌬ | OH | H | H | H | H | Do. |
| 7 | K₁₄ | —C₂H₄— | O | NH₂ | —NH—⌬(CH₃)(CH₃) | OH | H | H | H | H | Do. |
| 8 | K₁₅ | —C₂H₄— | O | NH₂ | —NH—⌬—OCH₃ | OH | H | H | H | H | Do. |
| 9 | K₁₆ | —C₂H₄— | O | NH₂ | —NH₂ | OH | H | H | H | H | Do. |
| 10 | K₁₇ | —C₂H₄— | O | NH₂ | —NH₂ | OH | H | H | H | H | Do. |
| 11 | K₁₈ | —C₂H₄— | O | NH₂ | —NH₂ | OH | H | H | H | H | Do. |
| 12 | K₂₂ | —C₂H₄— | O | NH₂ | —NH₂ | OH | H | H | H | H | Do. |
| 13 | K₂₃ | —C₂H₄— | O | NH₂ | —NH₂ | OH | H | H | H | H | Do. |
| 14 | K₂₄ | —C₂H₄— | O | NH₂ | —NH₂ | OH | H | H | H | H | Do. |
| 15 | K₂₇ | —C₂H₄— | O | NH₂ | —NH₂ | OH | H | H | H | H | Do. |
| 16 | K₉ | —C₂H₄— | S | NH₂ | —NH₂ | OH | H | H | H | H | Do. |
| 17 | K₁₀ | —C₂H₄— | S | NH₂ | —NH₂ | OH | H | H | H | H | Do. |
| 18 | K₁₁ | —C₂H₄— | S | NH₂ | —NH₂ | OH | H | H | H | H | Do. |
| 19 | K₁₂ | —C₂H₄— | S | NH₂ | —NH₂ | OH | H | H | H | H | Do. |
| 20 | K₁₃ | —C₂H₄— | S | NH₂ | —NH₂ | OH | H | H | H | H | Do. |
| 21 | K₁₇ | —C₂H₄— | S | NH₂ | —NH₂ | OH | H | H | H | H | Do. |
| 22 | K₁₈ | —C₂H₄— | S | NH₂ | —NH₂ | OH | H | H | H | H | Do. |
| 23 | K₁₀ | —CH₂—CH(CH₃)— | O | NH₂ | —NH₂ | OH | H | H | H | H | Do. |
| 24 | K₁₁ | Same as above | O | NH₂ | —NH₂ | OH | H | H | H | H | Do. |
| 25 | K₁₃ | do | O | NH₂ | —NH₂ | OH | H | H | H | H | Do. |
| 26 | K₁₇ | do | O | NH₂ | —NH₂ | OH | H | H | H | H | Do. |
| 27 | K₁₈ | do | O | NH₂ | —NH₂ | OH | H | H | H | H | Do. |
| 28 | K₂₃ | do | O | NH₂ | —NH₂ | OH | H | H | H | H | Do. |
| 29 | K₂₄ | do | O | NH₂ | —NH₂ | OH | H | H | H | H | Do. |
| 30 | K₁₀ | —CH₂CH₂CH₂— | O | NH₂ | —NH₂ | OH | H | H | H | H | Do. |
| 31 | K₂₃ | —CH₂CH₂CH₂— | O | NH₂ | —NH₂ | OH | H | H | H | H | Do. |
| 32 | K₁₀ | —C₂H₄OC₂H— | O | NH₂ | —NH₂ | OH | H | H | H | H | Do. |
| 33 | K₂₃ | —C₂H₄OC₂H— | O | NH₂ | —NH₂ | OH | H | H | H | H | Do. |
| 34 | K₁₀ | —C₂H₄NHC—CH₂—<br>‖<br>O | O | NH₂ | —NH₂ | OH | H | H | H | H | Do. |

Table I—Continued

| Expl. No. | $K^{\oplus}$ | T | Z | W | $X_1$ | $X_2$ | $X_3$ | $X_4$ | $X_5$ | $X_6$ | Shade of dyeing on acrylic fibre |
|---|---|---|---|---|---|---|---|---|---|---|---|
| 35 | $K_{21}$ | —C₂H₄—NH—C(=O)—CH₂— | O | —NH₂ | —NH₂ | OH | H | H | H | H | Blue. |
| 36 | $K_{23}$ | Same as above | O | —NH₂ | —NH₂ | OH | H | H | H | H | Do. |
| 37 | $K_{10}$ | —C₂H₄—O—C(=O)—CH₂ | O | —NH₂ | —NH₂ | OH | H | H | H | H | Do. |
| 38 | $K_{22}$ | Same as above | O | —NH₂ | —NH₂ | OH | H | H | H | H | Do. |
| 39 | $K_{23}$ | ...do... | O | —NH₂ | —NH₂ | OH | H | H | H | H | Do. |
| 40 | $K_{10}$ | —C₂H₄— | O | —NH₂ | —NH₂ | OH | H | H | H | —CH₃ | Do. |
| 41 | $K_{13}$ | —CH₂—CH(CH₃)— | O | —NH₂ | —NH₂ | OH | H | H | H | —CH₃ | Do. |
| 42 | $K_{10}$ | —C₂H₄— | O | —NH₂ | —NH₂ | OH | H | H | H | OCH₃ | Do. |
| 43 | $K_{12}$ | —C₂H₄— | O | —NH₂ | —NH₂ | OH | H | H | H | OCH₃ | Do. |
| 44 | $K_{13}$ | —C₂H₄— | O | —NH₂ | —NH₂ | OH | H | H | H | OCH₃ | Do. |
| 45 | $K_{10}$ | —C₂H₄— | O | —NHCH₃ | —NHCH₃ | OH | H | H | —CH₃ | H | Do. |
| 46 | $K_{11}$ | —C₂H₄— | O | —NHCH₃ | —NHCH₃ | OH | H | H | —CH₃ | H | Do. |
| 47 | $K_{13}$ | —C₂H₄— | O | —NHCH₃ | —NHCH₃ | OH | H | H | —CH₃ | H | Do. |
| 48 | $K_{18}$ | —C₂H₄— | O | —NHCH₃ | —NHCH₃ | OH | H | H | H | H | Do. |
| 49 | $K_{23}$ | —C₂H₄— | O | —NH—C₂H₅ | —NH—C₂H₅ | OH | H | H | H | OCH₃ | Do. |
| 50 | $K_{10}$ | —C₂H₄— | O | —NH₂ | —NH₂ | OH | H | H | H | Cl | Do. |
| 51 | $K_{12}$ | —C₂H₄— | O | —NH₂ | —NH₂ | OH | H | H | Cl | —CH₃ | Do. |
| 52 | $K_{13}$ | —C₂H₄— | O | —NH₂ | —NH₂ | OH | H | H | H | Cl | Do. |
| 53 | $K_{10}$ | —C₂H₄— | O | —NH₂ | —NH₂ | OH | H | Br | Br | Cl | Do. |
| 54 | $K_{13}$ | —C₂H₄— | O | —NH₂ | —NH₂ | OH | Br | H | Br | Cl | Do. |
| 55 | $K_{23}$ | —C₂H₄— | O | —NH₂ | —NH₂ | OH | Br | H | Cl | Cl | Do. |
| 56 | $K_{24}$ | —C₂H₄— | O | —NH₂ | —NH₂ | OH | Br | H | H | Cl | Do. |
| 57 | $K_9$ | —C₂H₄— | O | —NH₂ | —NH₂ | OH | H | H | H | H | Do. |
| 58 | $K_{10}$ | —C₂H₄— | O | —NH₂ | —NH₂ | OH | H | H | H | H | Do. |
| 59 | $K_{11}$ | —C₂H₄— | O | —NH₂ | —NH₂ | OH | H | H | H | H | Do. |
| 60 | $K_{12}$ | —C₂H₄— | O | —NH₂ | —NH₂ | OH | H | H | H | H | Do. |
| 61 | $K_{13}$ | —C₂H₄— | O | —NH₂ | —NH₂ | OH | H | H | H | H | Do. |
| 62 | $K_{14}$ | —C₂H₄— | O | —NH₂ | —NH₂ | OH | H | H | H | H | Do. |
| 63 | $K_{15}$ | —C₂H₄— | O | —NH₂ | —NH₂ | OH | H | H | —CH₃ | H | Do. |
| 64 | $K_{16}$ | —C₂H₄— | O | —NH₂ | —NH₂ | OH | H | H | H | H | Do. |
| 65 | $K_{17}$ | —C₂H₄— | O | —NH₂ | —NH₂ | OH | H | H | H | H | Do. |
| 66 | $K_{19}$ | —C₂H₄— | O | —NH₂ | —NH₂ | OH | H | H | H | —CH₃ | Do. |
| 67 | $K_{22}$ | —C₂H₄— | O | —NH₂ | —NH₂ | —OH | H | H | H | H | Do. |
| 68 | $K_{23}$ | —C₂H₄— | O | —NH₂ | —NH₂ | —OH | H | H | H | H | Do. |
| 69 | $K_{24}$ | —C₂H₄— | O | —NH₂ | OH | —OH | H | H | H | H | Do. |
| 70 | $K_{27}$ | —C₂H₄— | O | —NH₂ | OH | —OH | H | H | H | H | Do. |
| 71 | $K_{10}$ | —C₂H₄— | O | OH | NH₂ | NH₂ | H | H | H | H | Do. |
| 72 | $K_{11}$ | —C₂H₄— | O | OH | NH₂ | NH₂ | H | H | H | H | Do. |
| 73 | $K_{13}$ | —C₂H₄— | O | OH | NH₂ | NH₂ | H | H | H | H | Do. |
| 74 | $K_{10}$ | —C₂H₄— | O | NH₂ | NO₂ | OH | H | H | H | H | Do. |
| 75 | $K_{13}$ | —C₂H₄— | O | NH₂ | NO₂ | OH | H | H | —CH₃ | H | Do. |
| 76 | $K_{23}$ | —C₂H₄— | O | NH₂ | NO₂ | OH | H | H | H | H | Do. |

EXAMPLE 77

A compound of the formula

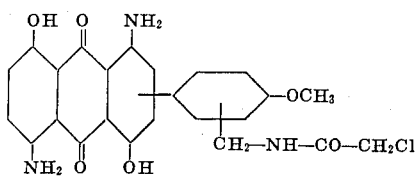
(a)

produced by reacting 36.9 parts of a compound of the formula

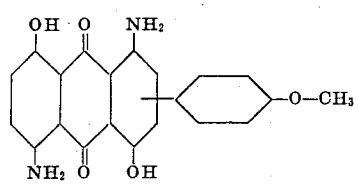

(as disclosed in French Patent 1,218,936) with 12.4 parts of N-hydroxymethylchloracetamide, is mixed with a solution of dimethylamine and nitrobenzene in a shaking machine and this reaction mixture is shaken for several days. Subsequently it is filtered and the filtrate is concentrated with vacuum. On the addition of methyl alcohol a dye of the formula

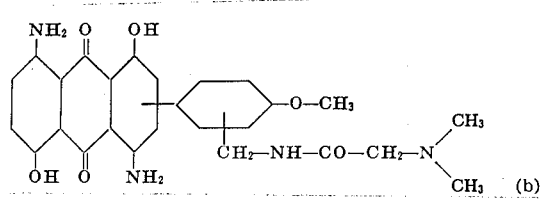
(b)

settles out. It dyes acrylic fibres in blue shades with good all-round fastness.

The dyes listed in the following Table II can be produced by the procedures described for the dye of Example 77. The dyes in the table have the general formula

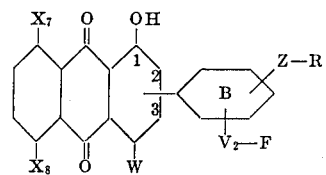

where $X_7$, $X_8$, $V_2$, W, Z, R and F have the meanings given them in Table II and the ring B occupies the positions on the anthraquinone nucleus given in this table. The symbol F may stand for any one of the radicals $F_8$ to $F_{10}$ listed in Table B. These groupings may be exchanged for any other of the given groupings in any individual dye.

Table B

F may stand for any one of the symbols $F_8$ to $F_{10}$ which represent the groupings listed hereunder:

| | | |
|---|---|---|
| $F_8$ | represents | $-N\begin{pmatrix} CH_2-CH_2 \\ CH_2-CH_2 \end{pmatrix}O$ |
| $F_9$ | " | $-N\begin{pmatrix} CH_2-CH_2 \\ CH_2-CH_2 \end{pmatrix}$ |
| $F_{10}$ | " | $-N\begin{pmatrix} CH_2-CH_2 \\ CH_2-CH_2 \end{pmatrix}CH_2$ |

(b) is dissolved in dimethyl formamide and a current of gas consisting of chloramine, ammonium and nitrogen is directed into the solution at about 30° for 40 minutes.

A dye identical with that obtained in accordance with Example 172 can be produced by dissolving 10 parts of the compound of formula (b) obtained as given in Example 141 in 280 parts of nitrobenzene dropping in 7 parts of dimethylsulphate at this temperature, and stirring the mixture for 2 hours with a simultaneous temperature increase to 120°. The dye settles out and is filtered off, washed with nitrobenzene and toluene, and dried. This procedure gives a dye containing as anion the $CH_3SO_4^-$-group.

The dyes detailed in the following Table III can be produced in the same manner as the dyes described in

TABLE II

| Expl. No. | F | Position of ring B | $V_2$ | W | $X_7$ | $X_8$ | Z | R | Shade of dyeing on acrylic fibre |
|---|---|---|---|---|---|---|---|---|---|
| 78 | $F_8$ | 3 | $-CH_2$ | $-NH_2$ | $-NH_2$ | $-OH$ | O | $-CH_3$ | Blue. |
| 79 | $F_9$ | 3 | $-CH_2$ | $-NH_2$ | $-NH_2$ | $-OH$ | O | $-CH_3$ | Do. |
| 80 | $F_{10}$ | 3 | $-CH_2$ | $-NH_2$ | $-NH_2$ | $-OH$ | O | $-CH_3$ | Do. |
| 81 | $F_8$ | 2 | $-CH_2$ | $-NH_2$ | OH | $-OH$ | O | $-CH_3$ | Do. |
| 82 | $F_{10}$ | 3 | $-CH_2NHCOCH_3$ | $-NH_2$ | $-NH-CH_2CH-CH_3$ $\quad\quad\quad\quad\quad\quad\quad OH$ | $-OH$ | O | $-CH_3$ | Greenish blue. |

EXAMPLE 83

10 parts of the compound (b) obtained as detailed in Example 141 and 5 parts of sodium hydroxide are suspended in 400 parts of water at 0°–5°. 12 parts of hydroxylamine-0-sulphonic acid are added with stirring, after which the mixture is stirred for one hour at 0°–5° and then raised slowly to 80°. The residue is filtered off and dried. On extraction with ethanol a dye is obtained which is identical with that of Example 171, except that with this procedure the $HSO_4^-$-group is obtained as anion.

The same dye is formed when 10 parts of compound (b) obtained as given in Example 141 are reacted with chloramine. For this purpose the compound of formula (b)

Example 83. They are of the general formula

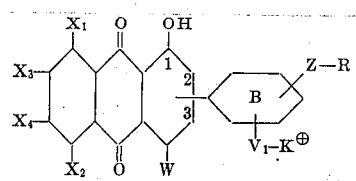

where the symbols $K^+$, $V_1$, Z, R, $X_1$ to $X_4$ have the significances given them in Table III and the ring B occupies the position on the anthraquinone nucleus given in the table. The anion $A^-$ may be any one of those named in the specification. The symbol $K^+$ may stand for any one of the radicals $K_9$ to $K_{18}$, $K_{22}$ to $K_{24}$ or $K_{27}$ named in the Table A.

TABLE III

| Expl. No. | $K^+$ | Position of ring B | $V_1$ | Z | R | W | $X_1$ | $X_2$ | $X_3$ | $X_4$ | Shade of dyeing on acrylic fibre |
|---|---|---|---|---|---|---|---|---|---|---|---|
| 84 | $K_9$ | 3 | $-CH_2-$ | O | $-CH_3$ | $-NH_2$ | $-NH_2$ | $-OH$ | H | H | Blue. |
| 85 | $K_{10}$ | 3 | $-CH_2-$ | O | $-CH_3$ | $-NH_2$ | $-NH_2$ | $-OH$ | H | H | Do. |
| 86 | $K_{11}$ | 3 | $-CH_2-$ | O | $-CH_3$ | $-NH_2$ | $-NH_2$ | $-OH$ | H | H | Do. |
| 87 | $K_{12}$ | 3 | $-CH_2-$ | O | $-CH_3$ | $-NH_2$ | $-NH_2$ | $-OH$ | H | H | Do. |
| 88 | $K_{13}$ | 3 | $-CH_2-$ | O | $-CH_3$ | $-NH_2$ | $-NH_2$ | $-OH$ | H | H | Do. |
| 89 | $K_{14}$ | 3 | $-CH_2-$ | O | $-CH_3$ | $-NH_2$ | $-NH_2$ | $-OH$ | H | H | Do. |
| 90 | $K_{15}$ | 3 | $-CH_2-$ | O | $-CH_3$ | $-NH_2$ | $-NH_2$ | $-OH$ | H | H | Do. |
| 91 | $K_{16}$ | 3 | $-CH_2-$ | O | $-CH_3$ | $-NH_2$ | $-NH_2$ | $-OH$ | H | H | Do. |
| 92 | $K_{17}$ | 3 | $-CH_2-$ | O | $-CH_3$ | $-NH_2$ | $-NH_2$ | $-OH$ | H | H | Do. |
| 93 | $K_{18}$ | 3 | $-CH_2-$ | O | $-CH_3$ | $-NH_2$ | $-NH_2$ | $-OH$ | H | H | Do. |
| 94 | $K_{22}$ | 3 | $-CH_2-$ | O | $-CH_3$ | $-NH_2$ | $-NH_2$ | $-OH$ | H | H | Do. |
| 95 | $K_{23}$ | 3 | $-CH_2-$ | O | $-CH_3$ | $-NH_2$ | $-NH_2$ | $-OH$ | H | H | Do. |
| 96 | $K_{24}$ | 3 | $-CH_2-$ | O | $-CH_3$ | $-NH_2$ | $-NH_2$ | $-OH$ | H | H | Do. |
| 97 | $K_{10}$ | 3 | $-O-CH_2-CH_2$ | O | $-CH_3$ | $-NH_2$ | $-NH_2$ | $-OH$ | H | H | Do. |
| 98 | $K_{12}$ | 3 | $-O-CH_2-CH_2$ | O | $-CH_3$ | $-NH_2$ | $-NH_2$ | $-OH$ | H | H | Do. |
| 99 | $K_{13}$ | 3 | $-O-CH_2-CH_2$ | O | $-CH_3$ | $-NH_2$ | $-NH_2$ | $-OH$ | H | H | Do. |
| 100 | $K_{23}$ | 3 | $-O-CH_2-CH_2$ | O | $-CH_3$ | $-NH_2$ | $-NH_2$ | $-OH$ | H | H | Do. |
| 101 | $K_{10}$ | 3 | $-CH_2NH-CO-CH_3-$ | O | $-CH_3$ | $-NH_2$ | $-NH_2$ | $-OH$ | H | H | Do. |
| 102 | $K_{12}$ | 3 | $-CH_2NH-CO-CH_3-$ | O | $-CH_3$ | $-NH_2$ | $-NH_2$ | $-OH$ | H | H | Do. |
| 103 | $K_{24}$ | 3 | $-CH_2NH-CO-CH_3-$ | O | $-CH_3$ | $-NH_2$ | $-NH_2$ | $-OH$ | H | H | Do. |
| 104 | $K_{10}$ | 3 | $-CH_2-$ | S | $-C_2H_5$ | $-NH_2$ | $-NH_2$ | $-OH$ | H | H | Do. |
| 105 | $K_{23}$ | 3 | $-CH_2-$ | S | $-C_2H_5$ | $-NH_2$ | $-NH_2$ | $-OH$ | H | H | Do. |
| 106 | $K_{10}$ | 3 | $-O-CH_2CH-CH_3$ | O | $-CH_3$ | $-NH_2$ | $-NH_2$ | $-OH$ | H | H | Do. |
| 107 | $K_{12}$ | 3 | $-O-CH_2CH-CH_3$ | O | $-CH_3$ | $-NH_2$ | $-NH_2$ | $-OH$ | H | H | Do. |
| 108 | $K_{23}$ | 3 | $-O-CH_2CH-CH_3$ | O | $-CH_3$ | $-NH_2$ | $-NH_2$ | $-OH$ | H | H | Do. |
| 109 | $K_{10}$ | 2 | $-CH_2NH-CO-CH_3-$ | O | $-CH_3$ | $-NH_2$ | $-NH_2$ | $-OH$ | H | H | Do. |
| 110 | $K_{23}$ | 2 | $-CH_2NH-CO-CH_3-$ | O | $-CH_3$ | $-NH_2$ | $-NH_2$ | $-OH$ | H | H | Do. |
| 111 | $K_{10}$ | 3 | $-O-CH_2-CH_2$ | O | $-CH_3$ | $-NH-CH_3$ | $-NH-CH_3$ | $-OH$ | H | H | Do. |
| 112 | $K_{10}$ | 3 | $-O-CH_2-CH_2$ | O | $n-C_3H_7$ | $-NH_2$ | $-NH-\langle\ \rangle-CH_3$ $\quad\quad\quad\quad CH_3$ | $-OH$ | H | H | Do. |

EXAMPLE 113

The compound of formula

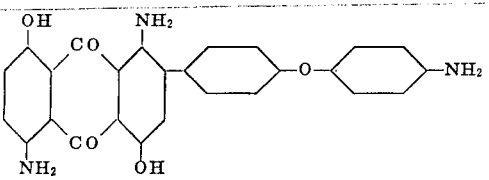

is prepared by reacting 21.5 parts of 1,5-diamino-4,8-dihydroxyanthraquinone-3,7-disulphonic acid and 14.5 parts of 4-aminophenyl-phenylether with subsequent cleavage of the $SO_3H$-group by the method described by J. Houben in "Das Anthracen und die Anthrachinone," 1929, page 449. 22.7 Parts of this compound are suspended in 227 parts of chlorobenzene at 70°–80°. 4 Parts of pyridine are added and then 6.2 parts of choroacetalchloride are added dropwise at 70°–80°. The mixture is stirred for 3 hours at 70°–80° and evaporated to dryness under reduced pressure. The residue is dispersed in water and filtered.

The product is a compound of formula

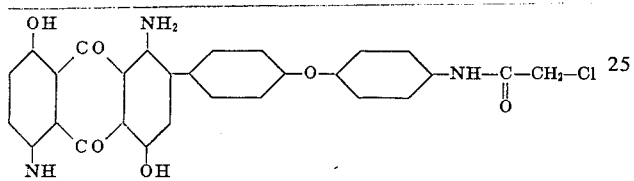

It is dissolved in 150 parts of dimethyl formamide at 80°, 6 parts of asymmetrical dimethylhydrazine are added and the mixture is then stirred for 12 hours at 60°. 300 Parts of chlorobenzene are dropped in, on which the dye of the formula

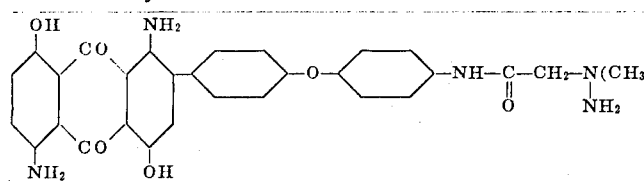

settles out. It is filtered off, washed with toluene and dried at 60° with vacuum. It is obtained as a blue-violet powder which dyes polyacrylonitrile fibres in bright blue shades.

EXAMPLE 114

A compound of the formula

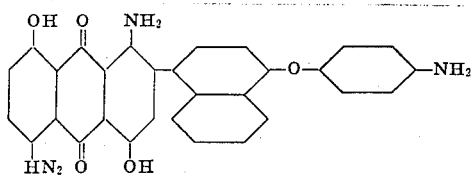

(prepared with 1,5-diamino-4,8-dihydroxyanthraquinone-3,7-disulphonic acid and 4-aminophenyl-naphthylether) is used in an amount equivalent to the amount used in Example 236 on which a dye with similarly good properties is obtained. It has the formula

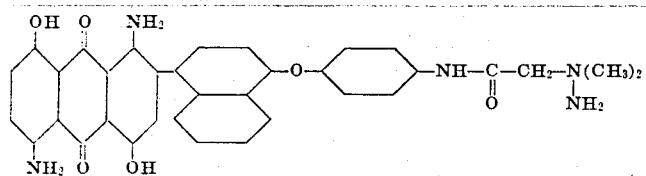

The structural composition of further dyes is listed in the following Table IV. They can be produced by the procedures of Examples 113 and 114 and correspond to the formula

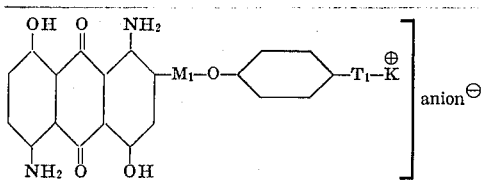

where $M_1$ represents a radical of formula

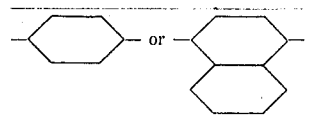

and $T_1$ and $K^+$ have the meanings given in the Table. The anion $^-$ can be any one of those named in the description. The significance of $K^+$ can be taken from Table A.

Table IV

| example No. | $T_1$ | $K^+$ | Shade of dyeing on acrylic fibre |
|---|---|---|---|
| 115 | —NH—CO—$CH_2$— | $K_{10}$ | blue |
| 116 | do | $K_{11}$ | do |
| 117 | do | $K_{12}$ | do |
| 118 | do | $K_{13}$ | do |
| 119 | do | $K_{17}$ | do |
| 120 | do | $K_{18}$ | do |
| 121 | do | $K_9$ | do |
| 122 | —$CH_2$— | $K_{10}$ | do |
| 123 | do | $K_{11}$ | do |
| 124 | do | $K_{12}$ | do |
| 125 | do | $K_{13}$ | do |
| 126 | do | $K_{17}$ | do |
| 127 | do | $K_{18}$ | do |
| 128 | do | $K_9$ | do |

EXAMPLE 129

5.6 Parts of the compound obtained as given in Example 2b are dissolved in 56 parts of glacial acetic at 30°. At this temperature 5.9 parts of propylene oxide are dropped in and the mixture is stirred at 30° until a thin layer chromatogram indicates that the starting material has completely reacted. The solution is concentrated with vacuum, upon which the dye of formula

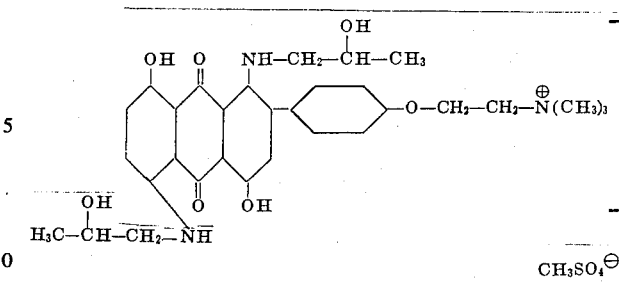

settles out in crystalline form. It is filtered off, washed with petroleum ether and dried. it is obtained as a blue powder which dyes acrylic fibres in deep greenish blue shades with good fastness properties.

EXAMPLE 130

The same dye is obtained when 4.3 parts of the starting compound used in Example 2a are dissolved in 43 parts of glacial acid at 30°, 5.9 parts of propylene oxide dropped in at this temperature and the reaction mixture stirred at 30° until a thin layer chromatogram shows that all the starting material has reacted. 215 Parts of water are added and the mixture made weakly alkaline, upon which a filterable precipitate settles out. The isolated product is washed until neutral and dried. It is a blue powder which has the formula

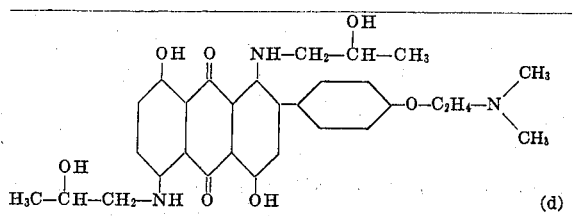

This dye gives a fast greenish blue dyeing on acrylic fibres. When the dye of formula (d) is dissolved in chlorobenzene at 80°, an equivalent amount of dimethylsulphate added and the mixture stirred for 12 hours at 80°, a dye is obtained which is identical with that of Example 129.

EXAMPLE 131

A mixture of 4.3 parts of the compound obtained as given in Example 4, 4 parts of potassium acetate and 18.7 parts of 1-bromo-4-methoxybenzene is held at 165° for 4 hours. On cooling, 160 parts of methanol are added, upon which the dye of the formula

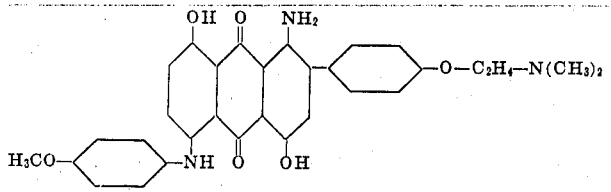

settles out. It can be recrystallized from dimethyl formamide. It gives bright greenish blue dyeings on acrylic fibres.

EXAMPLE 132

The dye obtained as described in Example 131 can be converted into the dye the formula

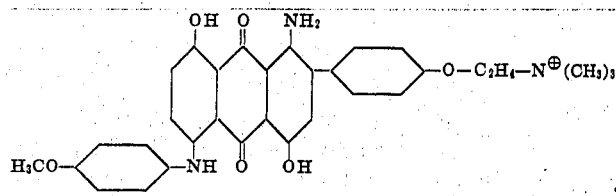

according to the procedures of Examples 2a or 2b.

EXAMPLE 133

The same dye as in Example 132 is obtained when the dye produced as given in Example 2b is reacted with 1-bromo-4-methoxybenzene.

DYEING EXAMPLE A

20 Parts of the dye of the formula

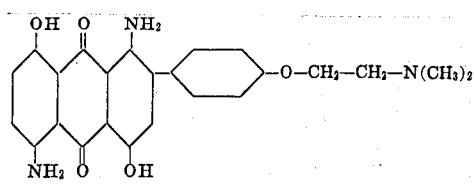

produced as given in Example 4 are mixed with 80 parts of dextrin in a ball mill for 48 hours. One part of the resulting preparation is pasted with 1 part of 40 percent acetic acid solution, and 400 parts of distilled water are run onto the paste with stirring, followed by boiling for a short time. The dye solution is added to 7,000 parts of distilled water, with the subsequent addition of 2 parts of glacial acetic acid. 100 Parts of a fabric of acrylic fibre, previously treated for 10 – 15 minutes at 60° in a bath of 8,000 parts of water and 2 parts of glacial acetic acid, are entered into the dyebath at 60°. The bath is raised to 100° in 20 minutes and held at this temperature for 1 hour. On removal the fabric is rinsed and dried. A fast, deep dyeing of bright blue shade is obtained which has good light and wet fastness. The dyes listed in the following Table VI can be produced by the procedure of Example 2a with the difference that sulphuric acid of 70 – 80 percent strength instead of 90 percent strength is used when further substituted phenylethers are employed, e.g.

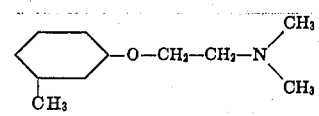

These dyes also can be dyed by the procedure given in Dyeing Example A.

The dyes have the formula

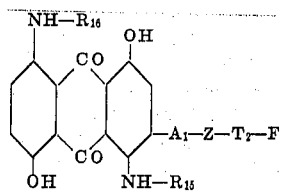

where $A_1$, $Z$, $T_2$, $R_{15}$, $R_{16}$ and F have the meaning given in Table VI. The symbol F can have any of the meanings given in Table B.

$Cl^{\ominus}$ or $CH_3SO_4^{\ominus}$

TABLE VI

| Expl. No. | $A_1$ | Z | $T_2$ | F | $R_{15}$ | $R_{16}$ | Shade of dyeing on acrylic fibre |
|---|---|---|---|---|---|---|---|
| 134 | —⟨  ⟩— | O | —$C_2H_4$— | $F_8$ | H | H | Blue. |
| 135 | Same as above | O | —$C_2H_4$— | $F_9$ | H | H | Do. |
| 136 | do | O | —$C_2H_4$— | $F_{10}$ | H | H | Do. |

Formulae of representative dyes of the foregoing specification are as follows:

EXAMPLE 2

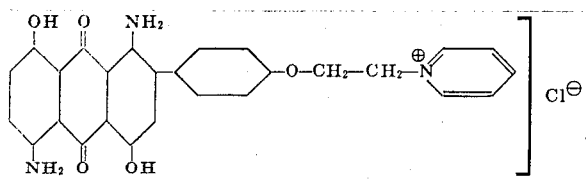

EXAMPLE 25

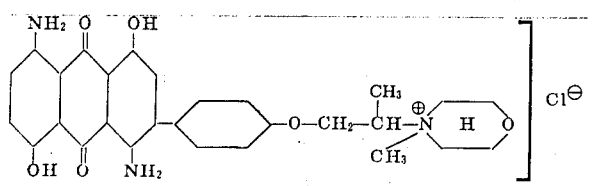

EXAMPLE 85

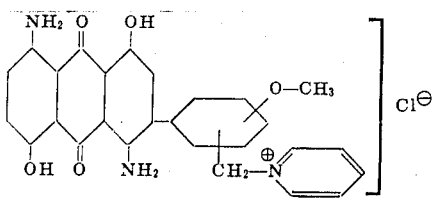

EXAMPLE 113

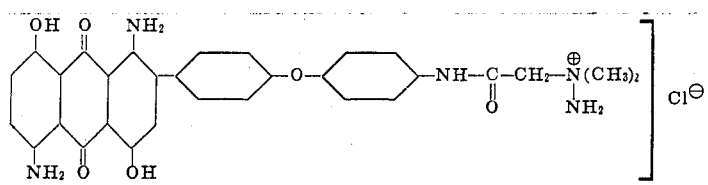

Having thus disclosed the invention what we claim is:
1. In the process for dyeing or printing of textile material consisting wholly or in part of acrylonitrile polymers which comprises applying to said material an anthraquinone dyestuff, the improvement wherein the anthraquinone is free from sulfonic acid groups and of the formula

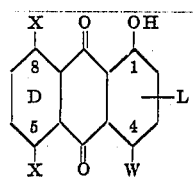

wherein
W is a member selected from the group consisting of nitro and -NH-R;
R is a member selected from the group consisting of hydrogen, a hydrocarbon radical and a substituted hydrocarbon radical; the hydrocarbon radical being alkyl having from one to 12 carbon atoms, cyclohexyl, methylcyclohexyl, aryl or aralkyl; the aryl of each aryl and each aralkyl being phenyl or naphthyl; any substituent on a substituted alkyl being hydroxy, halo or cyano; any substituent on a substituted aryl being hydroxy, halo, cyano, alkyl or alkoxy; and the alkyl of each alkyl and each alkoky, unless otherwise specified, having from one to six carbon atoms;
one X is a member selected from the group consisting of hydroxy, nitro and -NH-R;
the other X is a member selected from the group consisting of hydroxy and -NH-R;
L is in one of the positions 2 and 3 and is of one of the formulae:

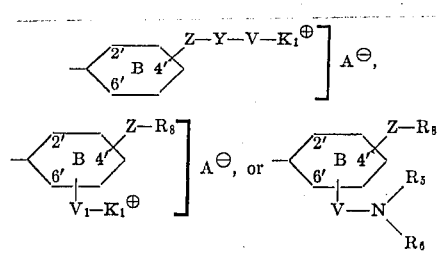

$A^-$ is an anion equivalent to the dye cation;
Z is -O- or -S-;
Y is a direct linkage or phenylene bound to V directly or through a hetero atom or group of hetero atoms; the hetero atom or group of hetero atoms being a member selected from the group consisting of -N(R)-, -O-, -S-, -N(R)-SO$_2$-, -N(R)-CO-, and -CO-N(R)-;
V is alkylene or alkylene interrupted by a hetero atom or group of hetero atoms; the alkylene having from one to 12 carbon atoms and the hetero atom or group of hetero atoms being a member selected from the group consisting of -N(R)-, -O-, -S-, -N(R)-SO$_2$-, -N(R)-CO-, and -CO-N(R)-;
$V_1$ is a divalent bridge member bound to $K_1^+$ through a carbon atom, the bridge member being selected from the group consisting of -(CH$_2$)$_p$-, -CH$_2$-C(CH$_3$)H-, -O-(CH$_2$)$_p$-, -(CH$_2$)$_p$-O-(CH$_2$)$_q$-, -CH$_2$-NH-CO-CO$_2$-, -CH$_2$-CHOH-CH$_2$-, -(CH$_2$)$_p$-O-CO-CH$_2$-, and -(CH$_2$)$_p$-NH-(CH$_2$)$_q$-;
each of $p$ and $q$ is, independently, a positive whole number from 1 to 6, inclusive;
$K_1$ is a group of one of the formulae

(II)

and $$-N\begin{matrix}R_9\\R_{10}\\R_{11}\end{matrix}$$ (VIII)

$R_1$ and $R_2$, taken together, with the adjacent N atom constitute a member selected from the group consisting of pyrrolidine, piperazine, morpholine, aziridine, and piperidine;

each of $R_3$ and $R_4$ is, independently, hydrogen, acyl or a substituted or unsubstituted member selected from the group consisting of alkyl, phenalkyl and cyclohexyl; any substituent of a substituted member being hydroxy, halo or cyano; each alkyl having from 1 to 6 carbon atoms; and each acyl being formyl, acetyl, propionyl, butyroyl, acryloyl, cyanoacetyl, benzoyl, methylsulphonyl or phenylsulphonyl;

or $R_1$ and $R_3$ and the two nitrogen atoms to which they are bound and/or $R_2$ and $R_4$ and the two nitrogen atoms to which they are bound form a saturated or unsaturated five- or six-membered heterocyclic ring in which the two nitrogen atoms are the only hetero atoms, in which case any remaining $R_1$ or $R_2$ is alkyl of one to six carbons or cyclohexyl of which the alkyl may be substituted by hydroxy, halo or cyano;

$R_8$ has one of the meanings of R;

$R_9$ and $R_{10}$, taken together with the adjacent N atom, and $R_5$ and $R_6$, taken together with the adjacent N atom constitute heterocyclic members selected from the group consisting of pyrrolidine, piperidine, morpholine, aziridine and piperazine;

$R_{11}$ being cyclohexyl, methylcyclohexyl or alkyl of one to six carbon atoms which may be substituted by halo, hydroxy, or cyano when $R_9$ and $R_{10}$ form a heterocycle;

or $R_9$, $R_{10}$, and $R_{11}$, together with the nitrogen atom to which each is bound is pyridinium or a group of the formula

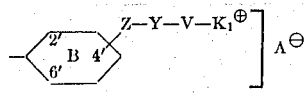

each ring of B and D is, independently, further unsubstituted or further substituted by a member selected from the group consisting of halo, hydroxy, alkyl and alkoxy of one to six carbon atoms, hydroxyphenyl and alkoxyphenyl; the alkyl of the alkoxyphenyl having from one to six carbon atoms; and Z is in one of the positions 2' and 4'.

2. A process according to claim 1 wherein L is

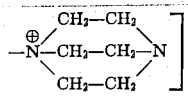

3. A process according to claim 1 wherein L is

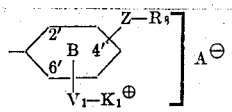

4. A process according to claim 1 wherein L is

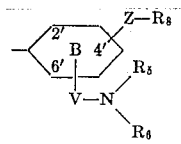

5. A process according to claim 1 wherein

Y is a direct linkage or phenylene bound directly to V,

V is alkylene of one to 12 carbon atoms, and $R_3$ and $R_4$, if not part of a heterocyclic ring, are, independently, hydrogen or a substituted or unsubstituted member selected from the group consisting of alkyl, phenalkyl and cyclohexyl, any substitutent being hydroxy, halo or cyano and each alkyl having one to six carbon atoms.

6. A process according to claim 2, in which at least one of the symbols X and W stands for an alkylamino or arylamino group which may be further substituted.

7. The process according to claim 1 wherein the anthraquinone is of the formula

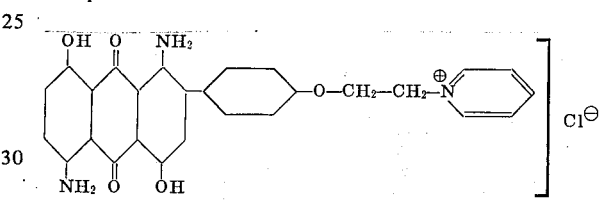

8. The process according to claim 1 wherein the anthraquinone is of the formula

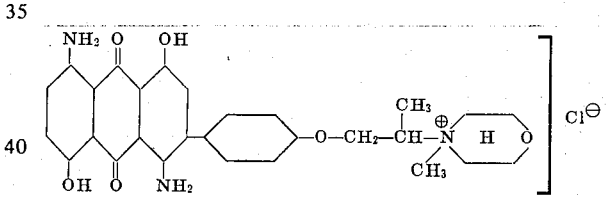

9. The process according to claim 1 wherein the anthraquinone is of the formula

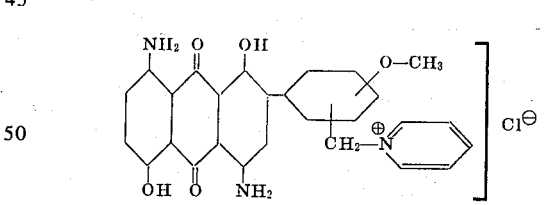

* * * * *